US007108513B2

(12) United States Patent
Belini et al.

(10) Patent No.: US 7,108,513 B2
(45) Date of Patent: Sep. 19, 2006

(54) METHOD AND SYSTEM FOR DISPLAYING FURNITURE

(75) Inventors: Mario Belini, Milan (IT); Giancarlo Bosio, Serravalle Scrivia (IT)

(73) Assignee: Natuzzi Americas, High Point, NC (US)

( * ) Notice: Subject to any disclaimer, the term of this patent is extended or adjusted under 35 U.S.C. 154(b) by 448 days.

(21) Appl. No.: 10/465,510

(22) Filed: Jun. 18, 2003

(65) Prior Publication Data

US 2004/0255524 A1 Dec. 23, 2004

(51) Int. Cl.
*G09B 25/00* (2006.01)

(52) U.S. Cl. ........................................ 434/382

(58) Field of Classification Search .................. 52/239; 296/21; 434/72, 79, 80, 382, 383
See application file for complete search history.

(56) References Cited

U.S. PATENT DOCUMENTS 2,765,544 A * 10/1956 Neveroski, Jr. .............. 434/72
3,603,004 A * 9/1971 Fink ............................ 434/73
3,904,079 A * 9/1975 Kross ............................ 222/2
3,945,467 A * 3/1976 Levitz ......................... 186/35
4,223,938 A * 9/1980 Born ........................... 296/21
5,471,800 A * 12/1995 Hill et al. ..................... 52/239
6,524,107 B1 * 2/2003 Brown ........................ 434/72
6,585,305 B1 * 7/2003 Nazginov et al. ............. 296/21

* cited by examiner

*Primary Examiner*—Kurt Fernstrom
(74) *Attorney, Agent, or Firm*—Womble, Carlyle, Sandridge & Rice, PLLC

(57) ABSTRACT

A system and method for displaying furniture in a showroom environment. A plurality of furniture pieces are displayed in a room setting having a plurality of walls to create the impression of a partially enclosed space. Adjacent room settings can have a transparent panel, such as a mesh screen or Plexiglas sheet, placed between them as a divider to simulate a wall, yet still enable the consumer to see through the transparent panel to view the furniture in either room. A large scale photographic image of the furniture in the room setting shows the same furniture pieces in actual use. The photographic image is mounted on a room wall generally behind and in proximity to the displayed furniture. A portal can be positioned at a front end of the room setting to simulate an entryway and to provide separation between other areas of the showroom floor. The portal is a free-standing structure that can be relocated easily. A portable fabric tree positioned in proximity to furniture pieces contains a number of samples of different fabrics and colors that can be selected for the furniture displayed in the room setting. An additional feature is a wall-mounted material sample display that provides one or more horizontal tiers or levels of material samples illustrating the availability of different colors and fabrics for the displayed furniture.

50 Claims, 10 Drawing Sheets

METHOD AND SYSTEM FOR DISPLAYING FURNITURE

BACKGROUND OF THE INVENTION

The present invention relates generally to furniture display and, more particularly to the display of furniture in a room setting that provides the consumer with an improved visual impression of how the displayed furniture would look in a home setting.

Over the past decade and longer, many traditional furniture stores have been replaced by furniture stores having a larger square footage for the display area in order to accommodate the preferences of a wider range of potential purchasers of home furnishings. The newer stores are generally owned by a furniture store chain, of which there are many examples.

Conventional retail furniture stores have been further displaced by combination warehouse-showrooms facilities in which large quantities of furniture are displayed, but generally grouped by type of furniture, e.g., bedroom furniture, living room furniture; dining room furniture, etc. Within the groups of furniture, many of the furniture selections are crowded together, and provide the consumer with little or no idea of how specific furniture items would look in the home. The larger showrooms frequently group particular items of furniture in an artificial room type setting that often represents a maze even to both experienced and casual shoppers. Even in the larger showrooms, it is difficult to show all the different styles and available fabrics for a given type of furniture. Furniture retailers often resort to swatch books to show a consumer the available fabrics and colors.

SUMMARY OF THE INVENTION

The present invention provides a method and system for displaying furniture in a showroom environment. In one aspect of the invention, a plurality of furniture items are displayed in a room setting having a plurality of walls to create the impression of a partially enclosed space. There would normally be multiple room settings each containing a several pieces of furniture that together would be placed in the same room if purchased, for example a sofa, love seat and matching chair. Adjacent room settings can have a transparent panel, such as a mesh screen or Plexiglas sheet, placed between them as a divider to simulate a wall, yet still enable the consumer to see through the transparent panel to view the furniture in either room. Alternatively, the transparent panel can be positioned adjacent an entrance to a room setting to simulate a wall and room divider.

Various other features of the invention can be combined with the transparent panel. One that is particularly advantageous is a large-scale photographic image of the furniture in the room setting that shows actual people using the same furniture pieces. The photographic image is mounted on a room wall generally behind and in proximity to the displayed furniture. Showing an image of people enjoying the use of the same furniture as displayed provides the consumer with the visual impression that he would similarly enjoy the same furniture if purchased.

Another feature of the invention is a portal that can be positioned at a front end of the room setting to simulate an entryway and provide separation between other areas of the showroom floor. The portal is a freestanding structure that can be relocated easily. The invention also contemplates the use of a portable fabric tree containing a number of samples of different fabrics and/or colors that can be selected for the furniture displayed in the room setting. Another additional feature of the invention is a wall-mounted material sample display that provides one or more horizontal tiers or levels of material samples illustrating the availability of different colors and fabrics for the displayed furniture. The material samples in each tier are arranged so as to hang vertically in a drape-like fashion.

DESCRIPTION OF DRAWINGS

The invention is better understood by reading the following detailed description of the invention in conjunction with the accompanying drawings, wherein.

DETAILED DESCRIPTION OF THE INVENTION

The following description of the invention is provided as an enabling teaching of the invention and its best, currently known embodiment. Those skilled in the art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations of the present invention are possible and may even be desirable in certain circumstances and are a part of the present invention. Thus, the following description is provided as illustrative of the principles of the present invention and not in limitation thereof since the scope of the present invention is defined by the claims.

Figure 1:
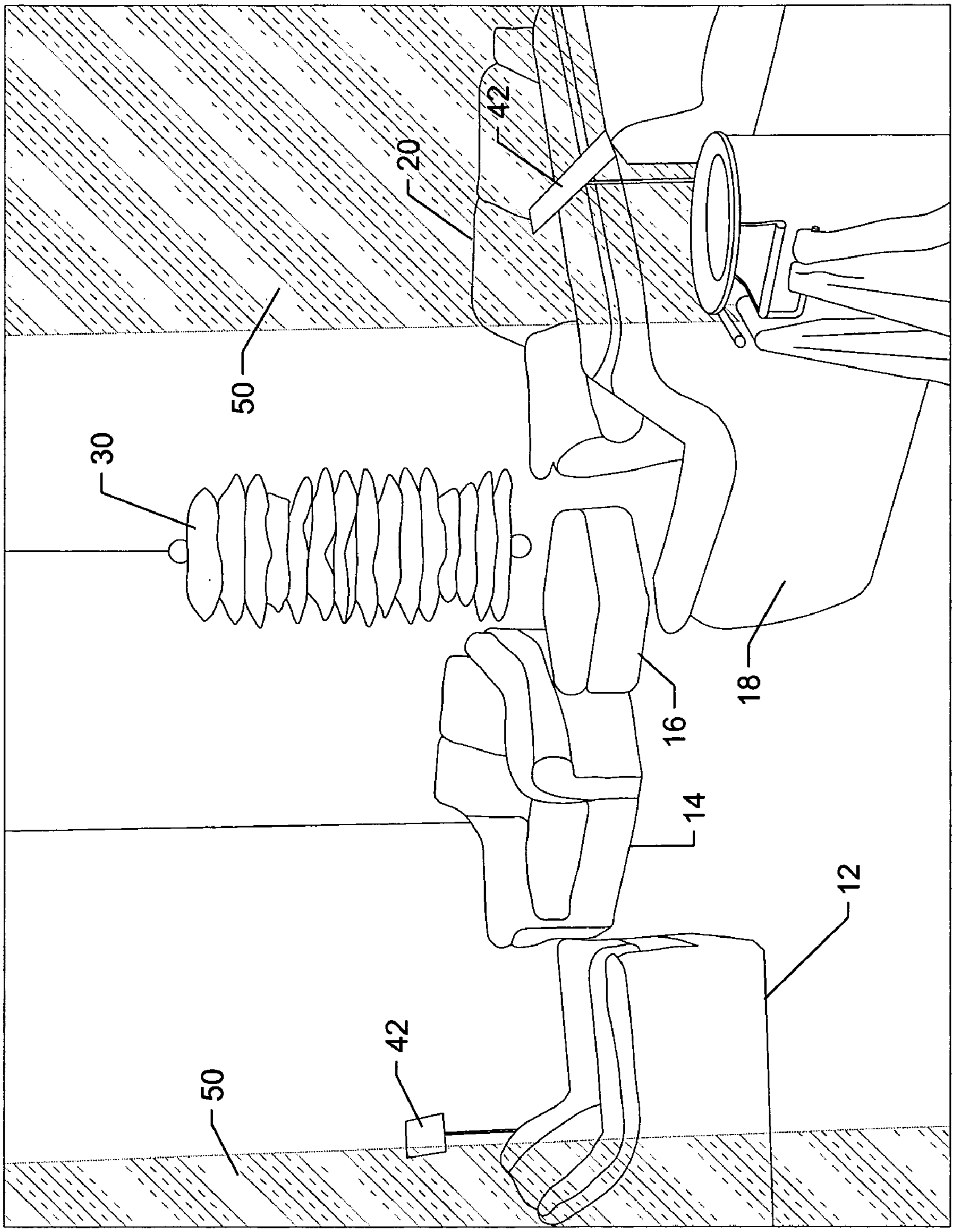
FIG. 1 illustrates the use of transparent panels and a portable fabric tree positioned in proximity to furniture pieces in a simulated room setting.

FIG. 1 illustrates an embodiment of the present invention that shows the use of transparent panels and a portable fabric tree positioned in proximity to furniture pieces in a simulated room setting. The multiple room settings in a furniture showroom would each contain several pieces of furniture 12, 14, 16, 18, 20 that together usually would be placed in the same room 10 in a home. Adjacent room settings can have a transparent panel 50 placed between them as a divider to simulate a wall, yet still enable a consumer to see through the transparent panel 50 to view the furniture in room setting 10 from the outside, or to view an additional room setting through the transparent panels. The transparent panel can be made from a mesh screen-like material, a Plexiglas sheet or other suitable transparent material. The transparent panel 50 can also be positioned adjacent to an entrance to a room setting 10 to simulate both a wall and a room divider. Portable pillow tree 30 contains a number of samples of different fabrics and colors that can be selected for the furniture 12, 14, 16, 18, 20 displayed in the room setting 10 as alternative furniture coverings. Also depicted in FIG. 1 are two information display stands 42 for displaying information describing the furniture located in proximity to the display stand.

Figure 2:
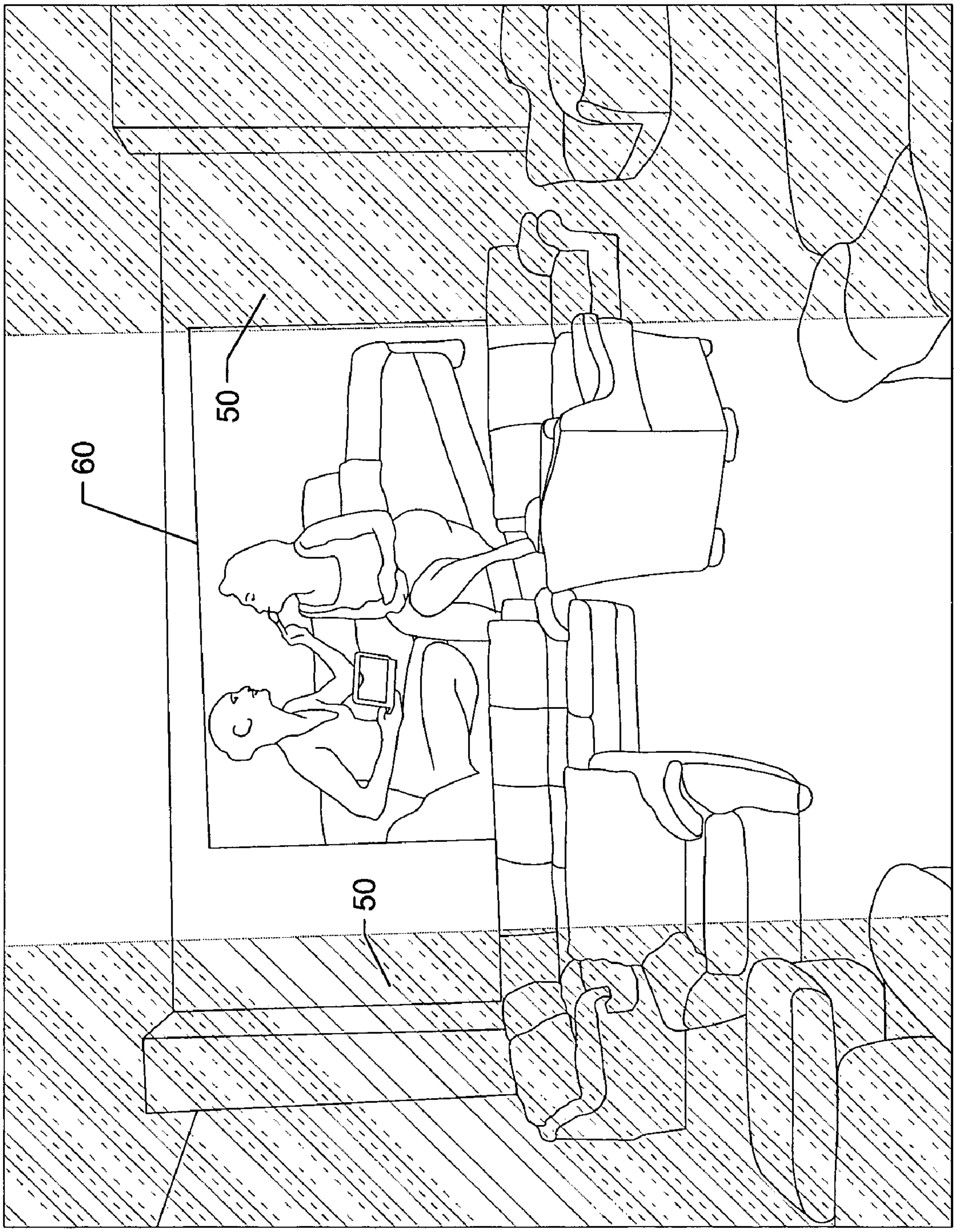
FIG. 2 illustrates a large-scale photographic image mounted on a rear wall of the simulated room setting in which the image depicts the same furniture being enjoyed in actual use.

FIG. 2 illustrates another embodiment of the invention that combines the use of transparent panels 50 with a large-scale photographic image 60 mounted on a rear wall of the simulated room setting. The photographic image 60 depicts the same furniture being displayed in the room setting in actual use and apparently being enjoyed by the people depicted in the photographic image. The message that is being conveyed to potential purchasers of the furniture pieces in the room setting is that they will experience the same kind of enjoyment and satisfaction should they purchase the furniture pieces depicted. The transparent panels 50 positioned in the foreground of the room setting serve as both a room divider and as an entrance to the room setting.

Figure 3:
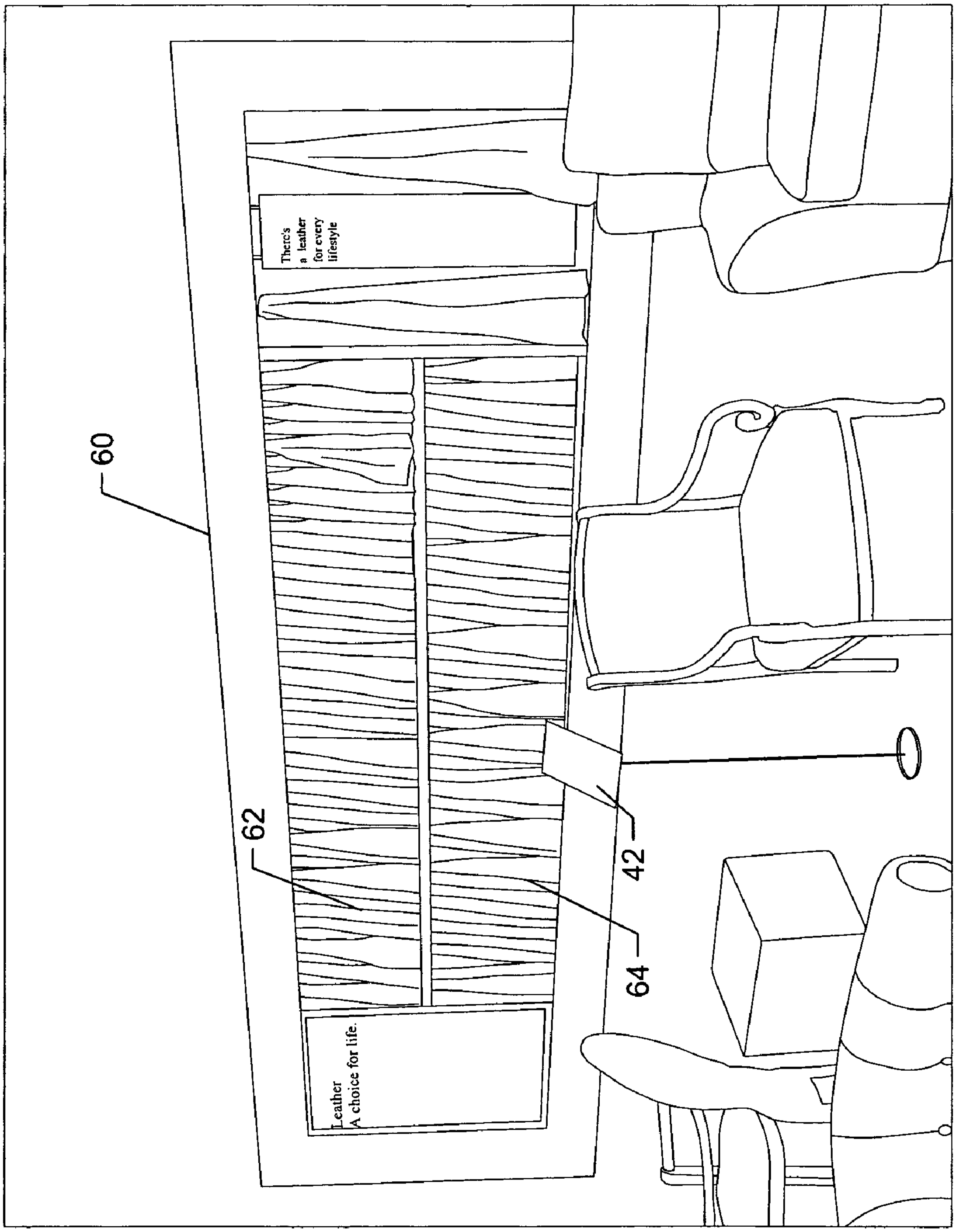
FIG. 3 illustrates a material sample display mounted on a wall of the simulated room setting.

FIG. 3 illustrates a material sample display 60 mounted on a wall of a simulated room setting. The material sample display 60 provides one or more horizontal tiers or levels 62, 64 of material samples illustrating the availability of different colors and fabrics for the displayed furniture. In the embodiment illustrated in FIG. 3, the wall-mounted material sample display 60 can also be referred to as a "fabric wall" since it depicts the various shadings of fabric that could be used as coverings for the furniture on display in the room setting.

Figure 4:
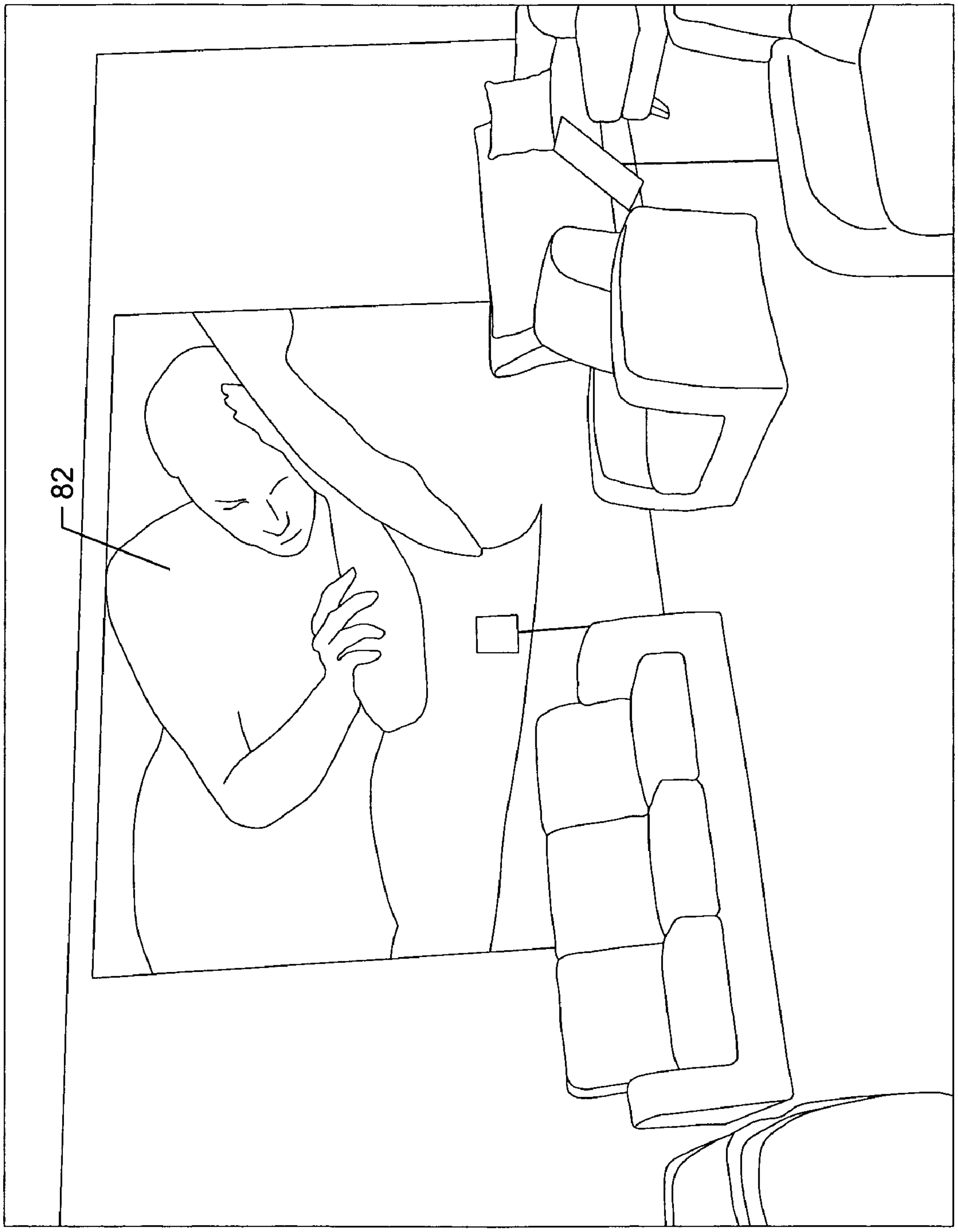
FIG. 4 illustrates another example of the use of large-scale photographic images mounted on a rear wall of the simulated room setting depicting furniture in actual use.
Figure 5:
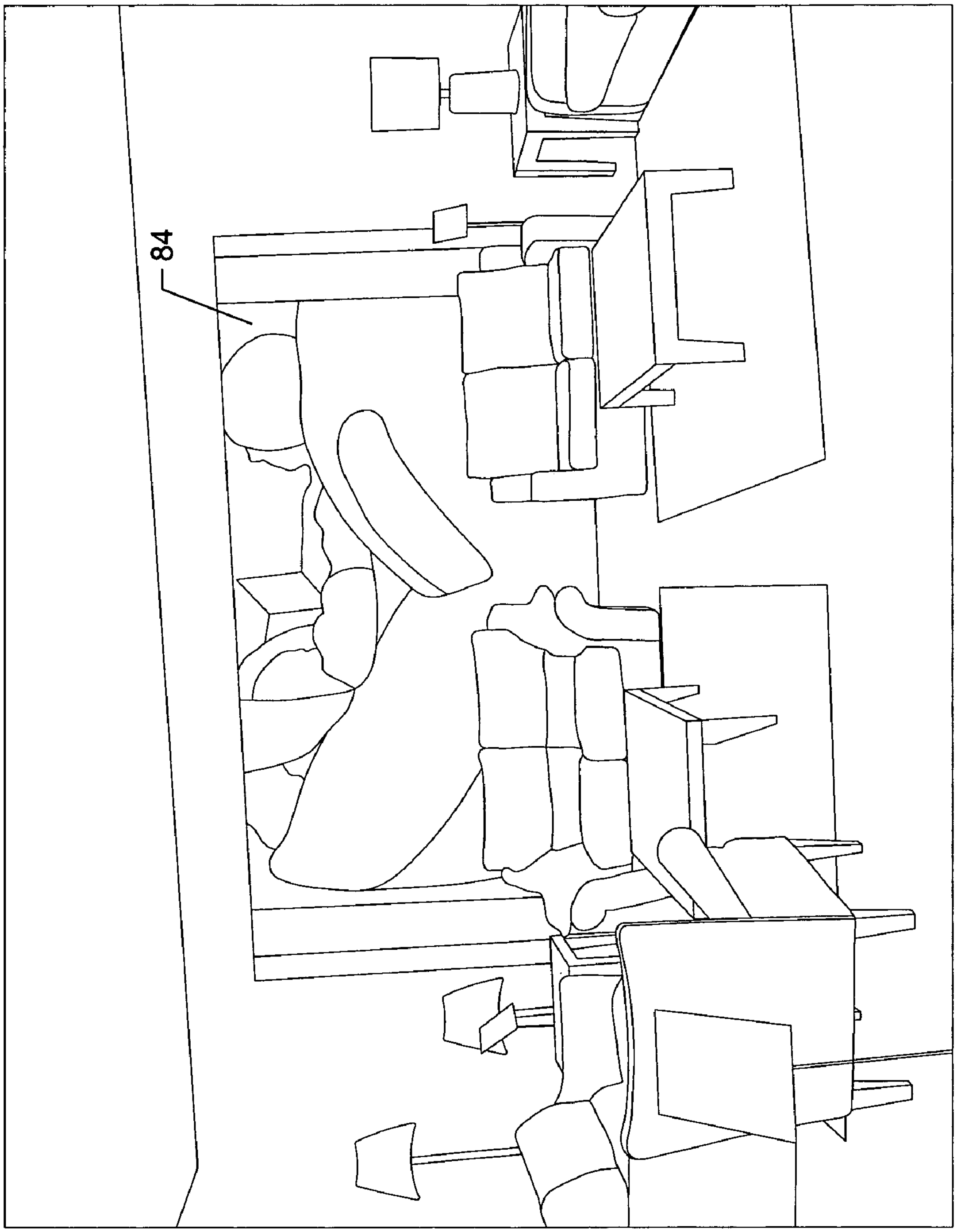
FIG. 5 illustrates an additional example of the use of large-scale photographic images positioned behind furniture pieces in a simulated room setting.

FIGS. 4 and 5 illustrate other examples of the use of large-scale photographic images mounted on a rear wall of a simulated room setting depicting furniture in actual use. There is a distinct advantage in including these large scale photographic images in as many room settings as possible to continue to build a favorable impression that a potential purchaser develops by repeated exposures to these photographic images as he migrates from one room setting to another within the furniture showroom. The large-scale photographic image is represented by reference numeral 82 in FIG. 4 and by reference numeral 84 in FIG. 5.

Figure 6:
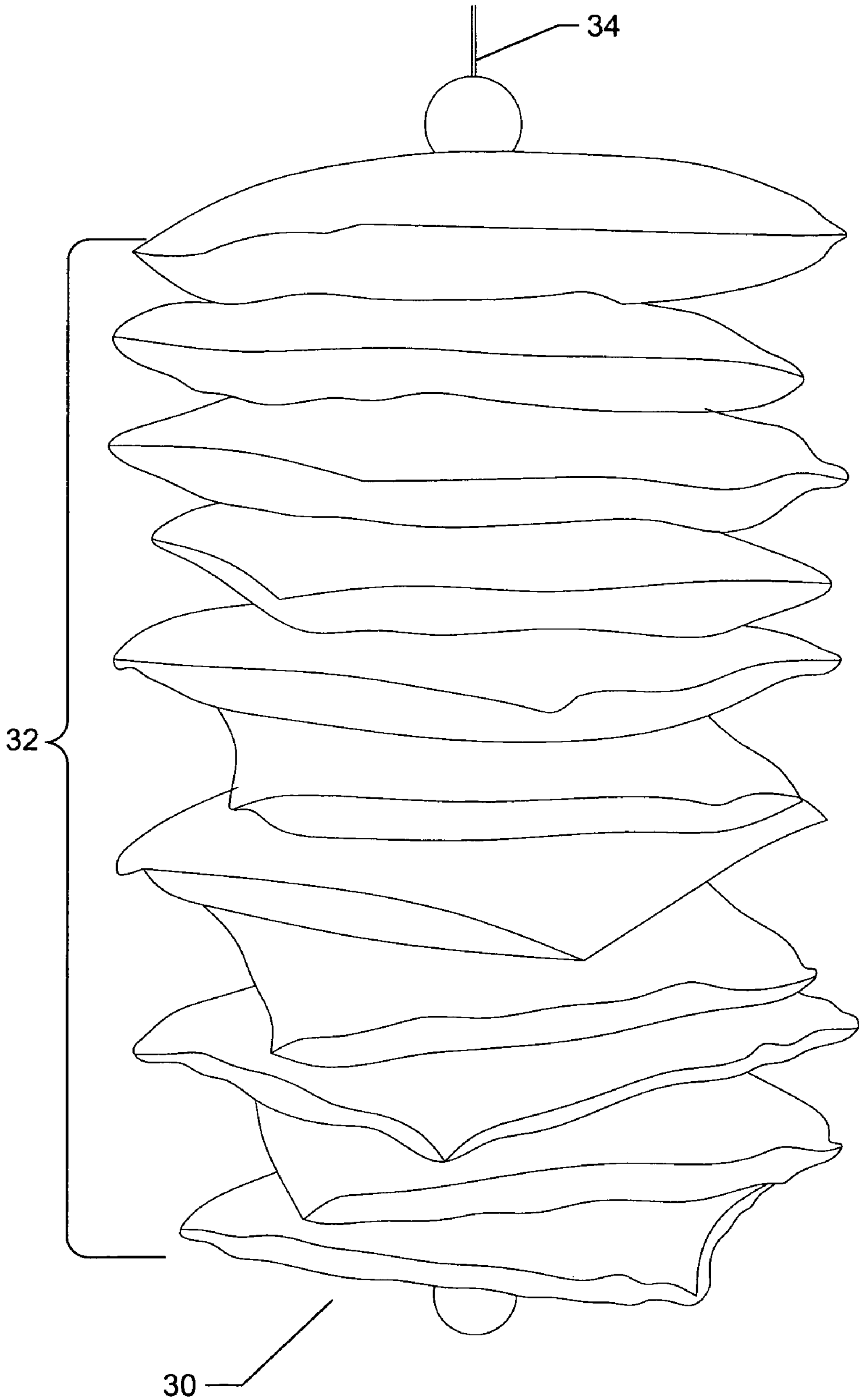
FIG. 6 illustrates another view of a portable fabric tree in which material samples are threaded onto a vertical wire to display available colors and fabrics.

FIG. 6 illustrates a close-up view of a portable fabric tree (e.g., pillow tree) 30 in which a plurality of material samples 32 are threaded onto vertical wire 34 to display available colors and fabrics for the furniture placed in proximity to the fabric tree.

Figure 7:
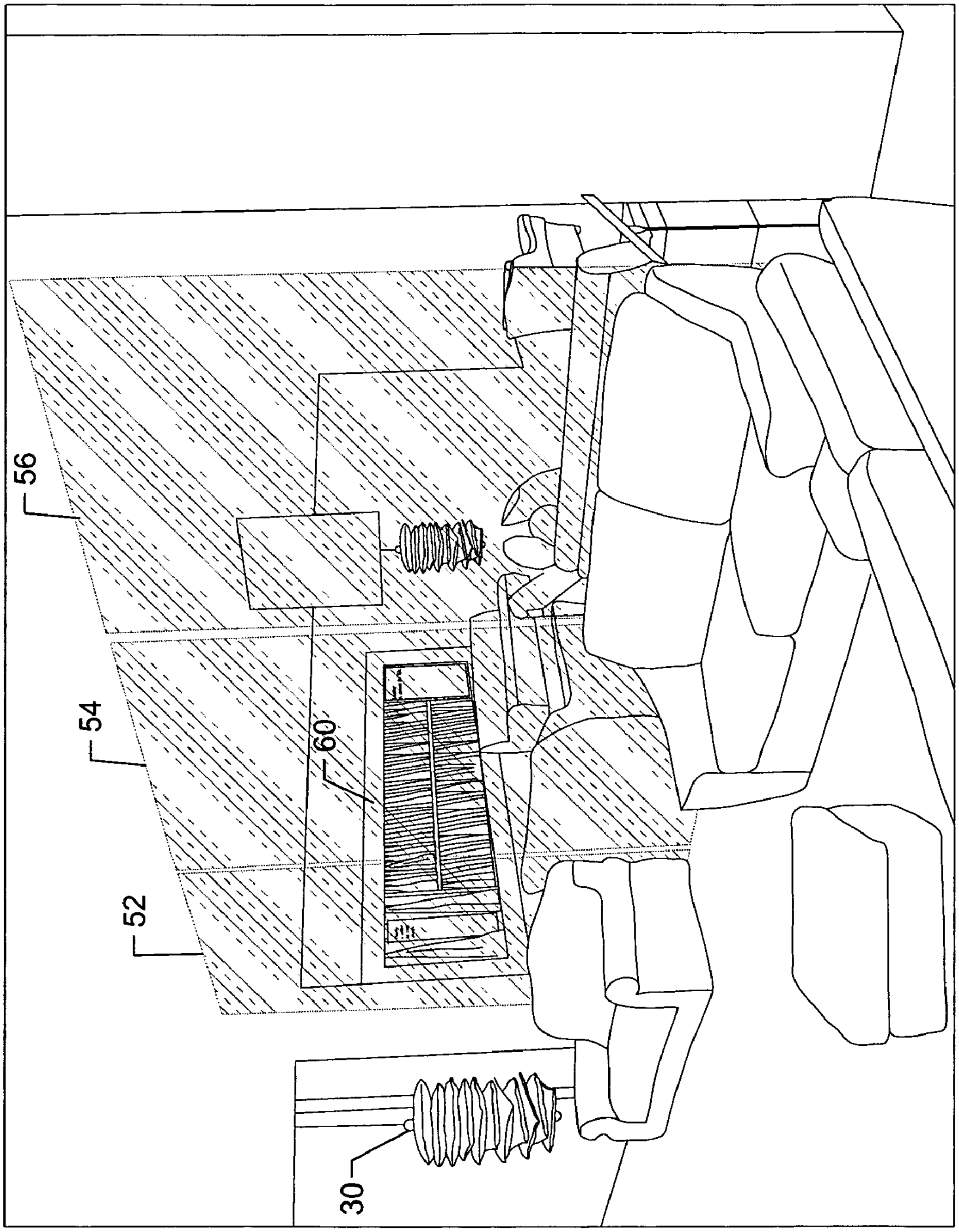
FIG. 7 illustrates another embodiment of the invention in which a transparent panel divides the furniture into multiple simulated room settings having a portable fabric tree in one simulated room and a wall-mounted material sample display in the adjacent simulated room.

FIG. 7 illustrates an embodiment of the invention in which a series of transparent panels 52, 54, 56 divides the displayed furniture into multiple simulated room settings. A portable fabric tree 30 is positioned in the first room setting depicted in the foreground of the figure. A wall-mounted material sample display 60 is positioned in the second room setting in the background of the figure.

Figure 8:
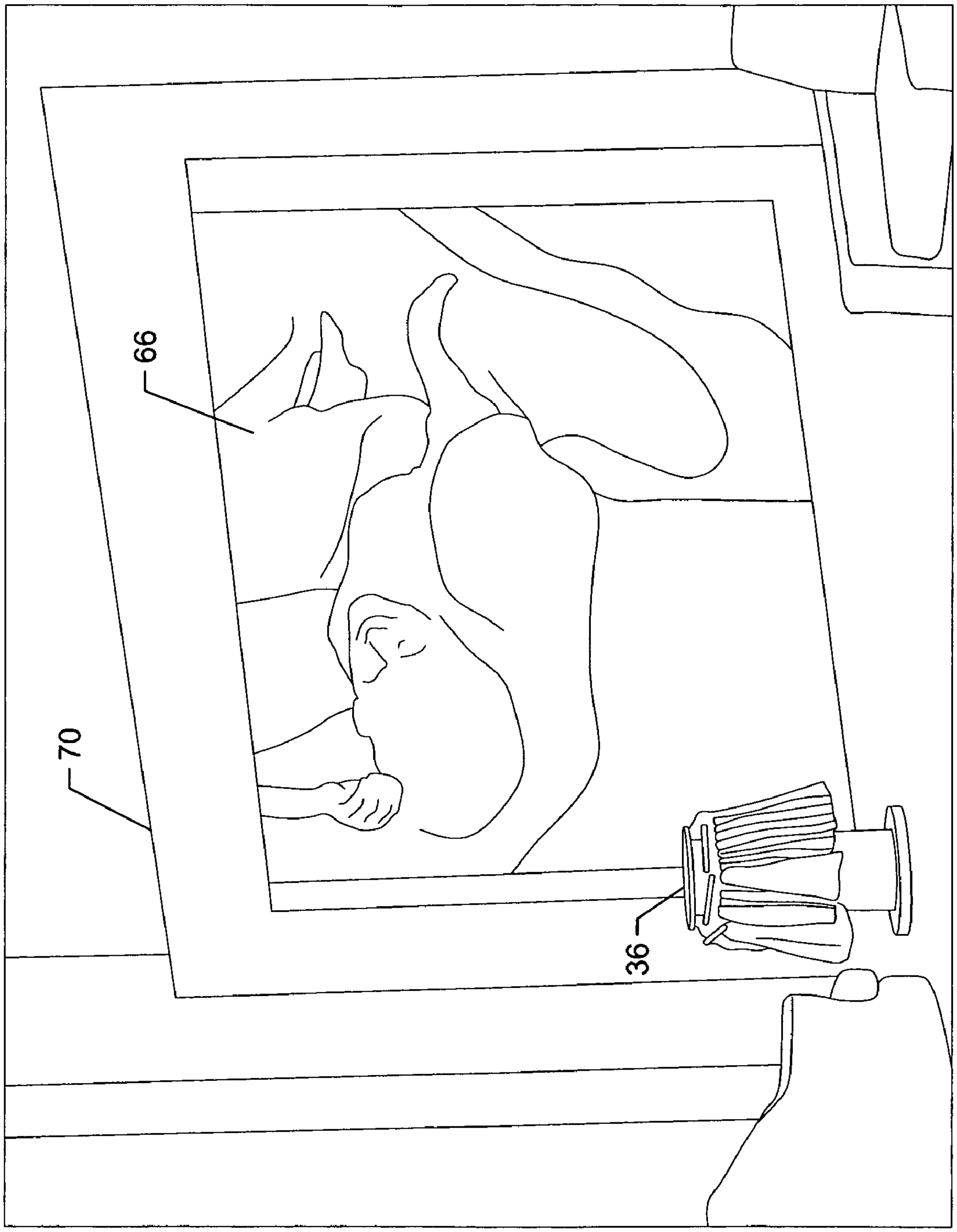
FIG. 8 illustrates a freestanding portal that suggests an entryway into a room setting.

FIG. 8 illustrates an embodiment of the invention in which a freestanding portal 70 is placed adjacent to a room setting to suggest an entryway. Also depicted in the figure is a large-scale photographic image 66 that is just inside the freestanding portal 70 and a portable fabric tree 36. Portable fabric tree 36 is an alternative to the pillow tree depicted in FIG. 6.

Figure 9:
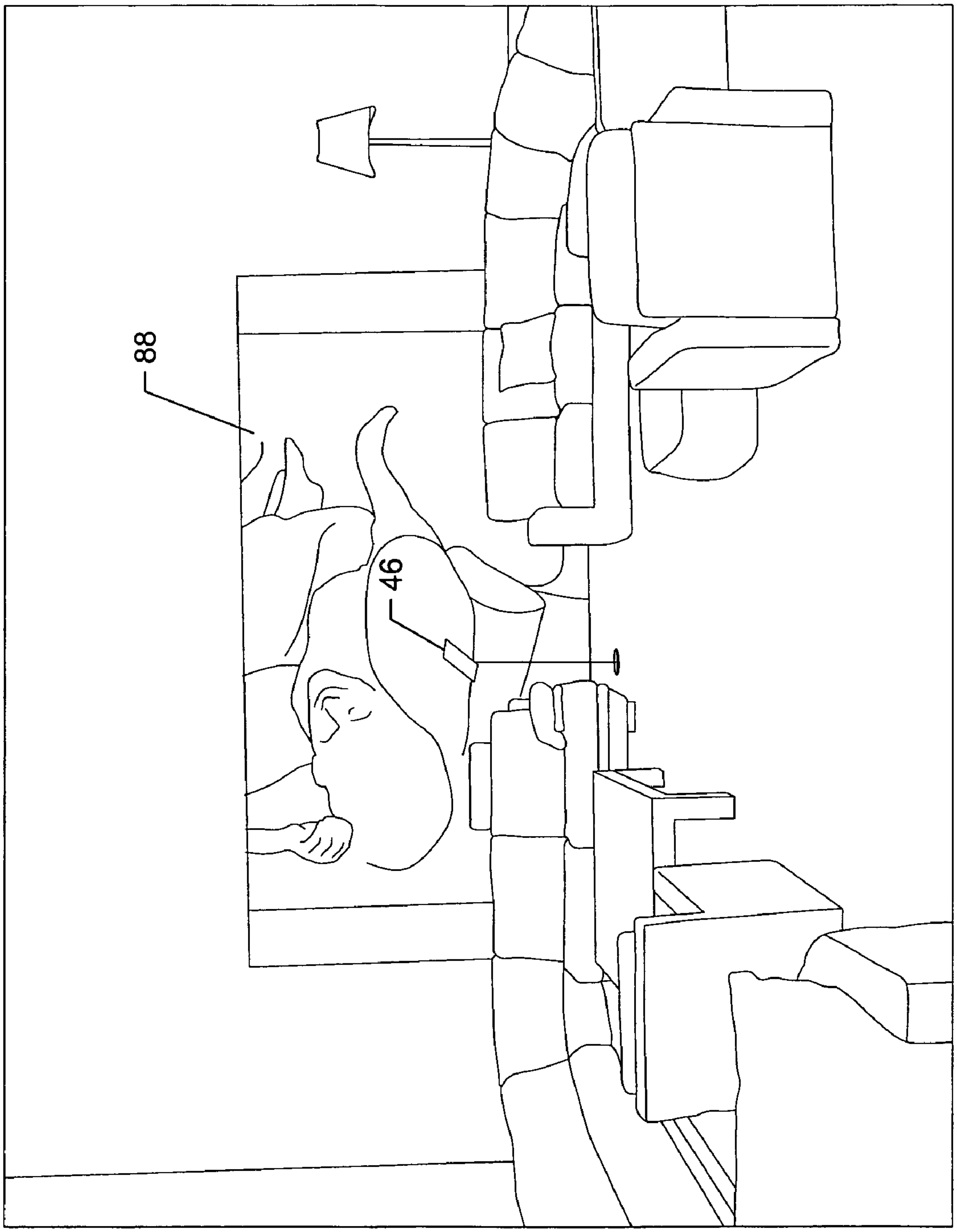
FIG. 9 illustrates an additional example of the use of large scale photographic images positioned behind furniture pieces in a simulated room setting along with an information display stand positioned in proximity to the furniture pieces.

FIG. 9 illustrates an additional example of the use of a large-scale photographic image 88 positioned behind furniture pieces in a simulated room setting, along with an information display stand 46 positioned in proximity to the furniture pieces.

Figure 10:
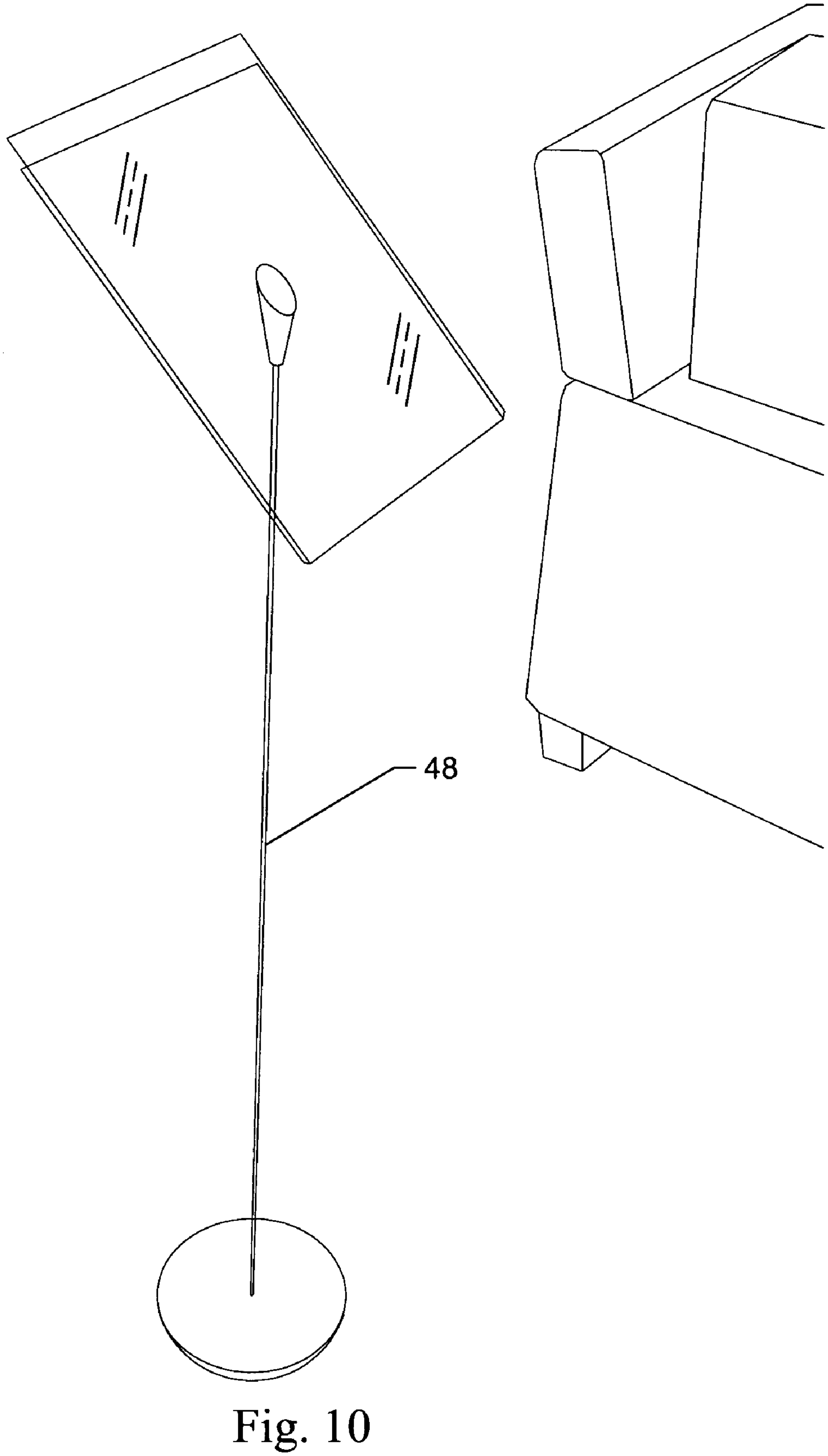
FIG. 10 illustrates an information display stand for displaying information describing the furniture located in proximity to the display stand in a simulated room setting.

FIG. 10 illustrates a close-up view of an information display stand 48 for displaying information described in the furniture located in proximity to the display stand in a simulated room setting.

The corresponding structures, materials, acts, and equivalents of any means plus function elements in the claims below are intended to include any structure, material or acts for performing the functions in combination with other claim elements as specifically claimed.

Those skilled in the art will appreciate that many modifications to the exemplary embodiment of the present invention are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in limitation thereof since the scope of the present invention is defined solely by the appended claims.

What is claimed is:

1. A system for displaying a plurality of furniture items in a room setting in a furniture showroom, the room setting having a plurality of walls, comprising:

a transparent panel positioned at a first end of a room setting to simulate a wall and a room divider while still enabling a customer to view an adjacent room setting in a showroom; and a photographic image mounted on a rear wall of the room setting and positioned in proximity to an item of furniture, the photographic image portraying at least one person using the same item of furniture.

2. The system for displaying a plurality of furniture items of claim 1 further comprising a portal positioned at a front end of the room setting to simulate an entryway and to serve as a separator between the room setting and an adjacent room setting.

3. The system for displaying a plurality of furniture items of claim 1 further comprising a portable fabric tree positioned in proximity to the item of furniture.

4. The system fur displaying a plurality of furniture items of claim 3 wherein the portable fabric tree includes a plurality of material samples threaded onto a vertical wire, each material sample representing a different color in which the item of furniture is available.

5. The system for displaying a plurality of furniture items of claim 4 wherein a material used for the plurality of material samples is a leather material.

6. The system for displaying a plurality of furniture items of claim 4 wherein a material used for the plurality of material samples is a cloth-like fabric.

7. The system for displaying a plurality of furniture items of claim 4 wherein the material samples are constructed as plurality of pillows, each pillow including a center opening extending completely through the pillow to facilitate mounting onto the vertical wire.

8. The system for displaying a plurality of furniture items of claim 1 further comprising a material sample display mounted on one wall of the room setting.

9. The system for displaying a plurality of furniture items of claim 8 wherein each material sample included in the display is ranged to hang vertically within the display.

10. The system for displaying a plurality of furniture items of claim 8 wherein the material sample display comprises a plurality of horizontal tiers, each tier including a plurality of vertically ranged samples.

11. The system for displaying a plurality of furniture items of claim 8 wherein a material used for the material sample display is a leather material.

12. The system for displaying a plurality of furniture items of claim 8 wherein a material used for the material sample display is a cloth-like fabric.

13. The system for displaying a plurality of furniture items of claim 1 further comprising an information display stand for the item of furniture, located at a place in the room setting that provides ready access to the displayed information but does not obstruct the customer's viewing of the room setting.

14. The system for displaying a plurality of furniture items of claim 2 wherein the portal is freestanding.

15. The system for displaying a plurality of furniture items of claim 1 wherein the photographic image is reproduced to an actual size that enables the customer to view and comprehend the contents of the photographic image at any location within the room setting.

16. A method for displaying a plurality of furniture items in a room setting in a furniture showroom, the room setting having a plurality of walls, comprising:

positioning a transparent panel at a first end of a room setting to simulate a wall and a room divider;

mounting a photographic image on a rear wall of the room setting, wherein the photographic image portrays at least one item of furniture in use by at least one person;

arranging the item of furniture in front of the photographic image; and positioning a portal at a front end of the room setting to simulate an entryway and to serve as a separator from an adjacent room setting.

17. The method for displaying a plurality of furniture items of claim 16 further comprising positioning a portable fabric tree in proximity to the item of furniture.

18. The method for displaying a plurality of furniture items of claim 17 further comprising the step of threading a plurality of material samples onto a vertical wire of the portable fabric tree, each material sample having an opening at or near a center point to facilitate mounting of each sample on the vertical wire.

19. The method for displaying a plurality of furniture items of claim 18 wherein each of the plurality of material samples represents a different color in which the item of furniture is available.

20. The method for displaying a plurality of furniture items of claim 18 wherein a material used for the plurality of material samples is a leather material.

21. The method for displaying a plurality of furniture items of claim 18 wherein a material used for the plurality of samples is a cloth-like fabric.

22. The method for displaying a plurality of furniture items of claim 18 wherein the material samples are fabricated as a plurality of pillows, each pillow having a center opening that extends completely through the pillow.

23. The method for displaying a plurality of furniture items of claim 16 further comprising mounting a material sample display on one wall of the room setting.

24. The method for displaying a plurality of furniture items of claim 23 further comprising arranging each material sample to hang vertically within the display.

25. The method for displaying a plurality of furniture items of claim 23 wherein the material sample display includes a plurality of horizontal tiers, each tier including a plurality of vertically arranged samples.

26. A method for displaying a plurality of furniture items in a room setting in a furniture showroom, the room setting having a plurality of walls, comprising:

positioning a transparent panel at a first end of a room setting to simulate a wall and a room divider;

mounting a photographic image on a rear wall of the room setting, wherein the photographic image portrays at least one item of furniture in use by at least one person;

arranging the item of furniture in front of the photographic image; and positioning a portable fabric tree in proximity to the item of furniture.

27. The method for displaying a plurality of furniture items of claim 26 further comprising the step of threading a plurality of material samples onto a vertical wire of the portable fabric tree, each material sample having an opening at or near a center point to facilitate mounting of each sample on the vertical wire.

28. The method for displaying a plurality of furniture items of claim 27 wherein each of the plurality of material samples represent a different color in which the item of furniture is available.

29. The method for displaying a plurality of furniture items of claim 27 wherein the material samples are fabricated as a plurality of pillows, each pillow having a center opening that extends completely through the pillow.

30. The method for displaying a plurality of furniture items of claim 26 further comprising mounting a material sample display on one wall of the room setting.

31. The method for displaying a plurality of furniture items of claim 30 further comprising arranging each material sample to hang vertically within the display.

32. The method for displaying a plurality of furniture items of claim 30 wherein the material sample display includes a plurality of horizontal tiers, each tier including a plurality of vertically arranged samples.

33. A method for displaying a plurality of furniture items in a room setting in a furniture showroom, the room setting having a plurality of walls, comprising:

positioning a transparent panel at a first end of a room setting to simulate a wall and a room divider;

mounting a photographic image on a rear wall of the room setting, wherein the photographic image portrays at least one item of furniture in use by at least one person;

arranging the item of furniture in front of the photographic image; and mounting a material sample display on one wall of the room setting.

34. The method for displaying a plurality of furniture items of claim 33 further comprising arranging each material sample to hang vertically within the display.

35. The method for displaying a plurality of furniture items of claim 33 wherein the material sample display includes a plurality of horizontal tiers, each tier including a plurality of vertically arranged samples.

36. The method for displaying a plurality of furniture items of claim 33 wherein each material sample represents a different color in which the item of furniture is available.

37. A method for displaying a plurality of furniture items in a room setting in a furniture showroom, the room setting having a plurality of walls, comprising:

positioning a transparent panel at a first end of a room setting to simulate a wall and a room divider;

arranging a plurality of items of furniture in the room setting; and positioning a freestanding portal at a front end of the room setting to simulate an entryway and to serve as a separator from an adjacent room setting.

38. A method for displaying a plurality of furniture items of claim 37 further comprising positioning a portable fabric tree in proximity to the item of furniture.

39. The method for displaying a plurality of furniture items of claim 38 further comprising the step of threading a plurality of material samples onto a vertical wire of the portable fabric tree, each material sample having an opening at or near a center point to facilitate mounting of each sample on the vertical wire.

40. The method for displaying a plurality of furniture items of claim 39 wherein each of the plurality of samples represents a different color in which the item of furniture is available.

41. The method for displaying a plurality of furniture items of claim 37 further comprising mounting a material sample display on one wall of the room setting.

42. The method for displaying a plurality of furniture items of claim 41 further comprising arranging each material sample to hang vertically within the display.

43. The method for displaying a plurality of furniture items of claim 41 wherein the material sample display includes a plurality of horizontal tiers, each tier including a plurality of vertically arranged samples.

44. A method for displaying a plurality of furniture items in a room setting in a furniture showroom, the room setting having a plurality of walls, comprising:

positioning a transparent panel at a first end of a room setting to simulate a wall and a room divider;

arranging a plurality of items of furniture in the room setting;

mounting a material sample display on one wall of the room setting; and positioning a portable fabric tree in proximity to an item of furniture.

45. The method for displaying a plurality of furniture items of claim 44 further comprising the step of threading a plurality of material samples onto a vertical wire of the portable fabric tree, each material sample having an opening at or near a center point to facilitate mounting of each sample on the vertical wire.

46. The method for displaying a plurality of furniture items of claim 45 wherein each of the plurality of samples threaded onto the portable fabric tree represents a different color in which an item of furniture is available.

47. The method for displaying a plurality of furniture items of claim 45 wherein the material samples are fabricated as a plurality of pillows, each pillow having a center opening that extends completely through the pillow.

48. The method for displaying a plurality of furniture items of claim 44 further comprising arranging each material sample to hang vertically within the display.

49. The method for displaying a plurality of furniture items of claim 44 wherein the material sample display includes a plurality of horizontal tiers, each tier including a plurality of vertically arranged samples.

50. The method for displaying a plurality of furniture items of claim 48 wherein each material sample in the material sample display represents a different color in which an item of furniture is available.

* * * * *